(No Model.)
E. THOMSON.
INDICATING APPARATUS FOR ELECTRIC CIRCUITS.
No. 508,662.  Patented Nov. 14, 1893.
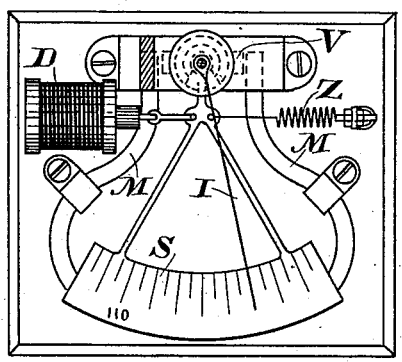
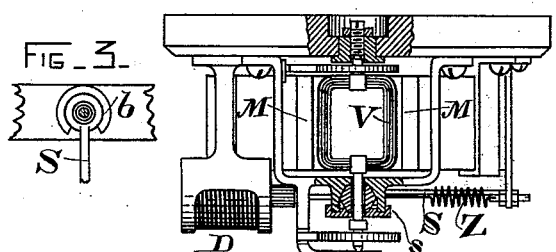
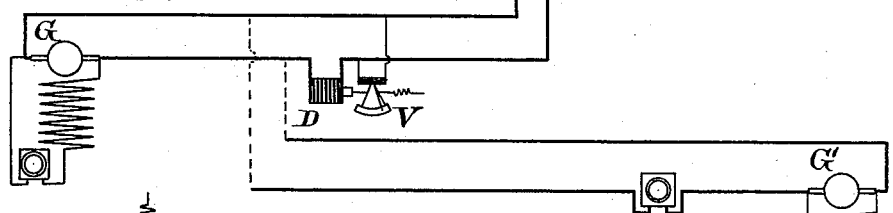
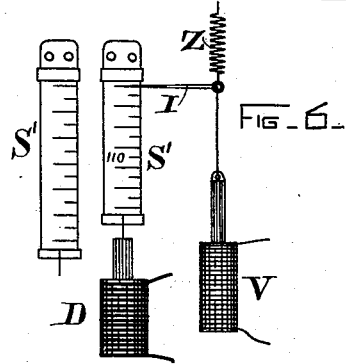
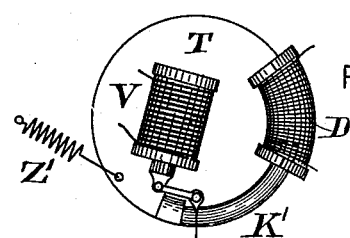
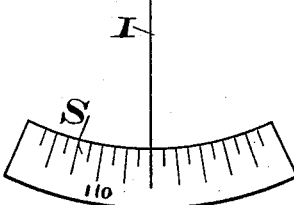
Witnesses.
Alec F. Macdonald.
T. J. Johnston.
Inventor-
Elihu Thomson by
Bentley and Blodgett,
Attys.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

INDICATING APPARATUS FOR ELECTRIC CIRCUITS.

SPECIFICATION forming part of Letters Patent No. 508,662, dated November 14, 1893.

Application filed July 1, 1893. Serial No. 479,330. (No model.)

*To all whom it may concern:*

Be it known that I, ELIHU THOMSON, a citizen of the United States, residing at Swampscott, in the county of Essex and State of Massachusetts, have invented a certain new and useful Improvement in Indicating Apparatus for Electric Circuits, of which the following is a specification.

My invention relates to indicating apparatus for electric circuits, and has for its object to provide an instrument indicating the voltage of a distant part of the line when the load on the line and the drop are varied. It is well known that when a supply line or feeder line, extending to a distant point, has no current traversing the same the potential between the outgoing and return wires will be practically the same for the whole extent of the line, and therefore that an indication of potential at or near the generating station will be true for the potential for the distant point; but when such a circuit carries a current to distant translating devices, its drop falsifies the indications of an instrument anywhere near the generating station, and a modified reading must be taken to deduce the true voltage, which would be definitely related to the voltage indicated unless there was a change in the drop due to some change in the circuit connections; but if the feeder line be permanent, this definite relation is continually preserved. In such cases an instrument constructed according to my invention may be applied to indicate the true voltage at the distant point. This result I accomplish by causing the volt-meter which indicates the potential to have a variable scale under control of the line current flowing through the feeder, so that the indications of the volt-meter needle will be changed by the movement of the scale in accordance with any change in the current traversing the circuit, and therefore in correspondence with the drop which occurs on the circuit. The instrument may be calibrated arbitrarily for the conditions of use, and thereafter will remain ready for use.

In the accompanying drawings Figure 1 is a front elevation; Fig. 2 a plan partly in section of my improved measuring instrument. Fig. 3 is a detailed view. Fig. 4 is a diagram of a system of distribution employing my invention, and Figs. 5, 6 and 7 are modifications.

In Fig. 1, I is an index or indicator which moves in accordance with a variation of voltage on a line. It may be moved by electromagnetic action, as when a fine coil, indicated at V, Figs. 1 and 2, is pivoted between the poles of a permanent magnet M, M, and connected across the mains the difference of potential of which is to be indicated; suitable springs or other devices being used to return the index to zero when no voltage exists between the terminals of the coil which moves the index. The index might be moved by other means, as by the expansion of a heated wire, like a Cardew volt-meter, or it might be moved by electro-static attraction and repulsion, as in electro-static volt-meters. With its scale S fixed, such an instrument can only indicate the voltage at that part of the line to which its terminals are connected; but in my invention I provide the scale S with means, such as a magnet D in a derived circuit, for swinging the scale into a position of greater and greater deflection as the current energizing the magnet D increases, a suitable retractor, or means for returning the scale to its original position being provided, as a spring Z pulling back the core of the direct magnet D. It is desirable, though not essential, to have the scale swing from the same center as the volt-meter index, or from centers in line therewith. The suspension of the scale is shown as at *s*, Fig. 2, surrounding the pivots of the volt-meter coil B, suitable supports being provided to maintain the parts in their proper relative positions; the details of the support are shown in Fig. 3, where the arm supporting the scale is marked S and its swing bearing surrounding the center is indicated at *b*. The power of the retractor-spring Z and the turns of the magnet D, or its pulling power, are adjusted so that upon a certain current flowing it moves the scale so as to make the indicator, I, fall back partly toward zero and in a proportion depending on the drop on the line in which the magnet D is connected, such line being the main line conveying current to a distant point, or a feeder line in a system of electric distribution. Thus in Fig. 4, G may represent a generator feeding the lines $l$, $l'$ between which, near the generator, is connected the volt-meter instrument V, while the magnet D of Figs. 1 and 2 is also marked D and serves to move the scale and reduce the readings of the voltmeter in correspondence with the direct current traversing the line $l'$. The line continued for a distance at last reaches the lights or other translating devices L, L, the number of which may be varied. Now, assuming all the lights cut off from such a system, and the generator G delivering one hundred and ten volts potential near its terminals, there will be one hundred and ten volts difference of potential at the distant part of the line, and the indicator or volt-meter at V will point to 110 on the scale. If now lights are turned on by the closing of switches, a current of increasing value, as lights are turned on, passes through the mains $l$, $l'$, to the distant points, and the voltmeter may, by proper arrangements at the generator G, continue to indicate one hundred and ten volts; but owing to the length and resistance of the lines $l, l'$, and the current traversing them, there will be a drop in voltage or loss of potential which will make the potential at the lights L, L, a certain amount below one hundred and ten volts; and this amount will increase as the current in the line increases, in accordance with well known principles. If now the scale of the volt-meter be moved in accordance with this increase of current and increase of drop so that the volt-meter near the generator reads lower in exact proportion to the drop caused by the increased current, the generator G is adjusted to strengthen its field so as to bring the index of the volt-meter again to 110, which will be accompanied by a potential of one hundred and ten volts at the lamps L, L, while there will be a higher voltage than one hundred and ten between the terminals of the volt-meter. The attendant, however, in adjusting the voltage need only watch the volt-meter and keep it constantly at one hundred and ten, while the lamps are receiving their normal potential notwithstanding the higher potential which is being generated. Instruments so constructed may be applied to systems in which a number of feeders are carried out and deliver current into an extended network, or in which a number of generators, as G, G', are coupled in multiple to feed a line or system; and they may be used wherever it is desired to indicate the conditions of voltage at distant points dependent upon unvarying conditions of line resistance, notwithstanding the variations of load or current carried by the line.

In Fig. 5 the compensating action applied to the scale itself or moving it bodily, as in Figs. 1 and 2, is replaced by an action on the index itself. Thus the index, I, may be carried by two cores, as at K, K', one of which acting against a suitable spring or retractor Z tends to carry the index downward, while the other, K', acting in the same way against a suitable retractor, tends to carry the index downward likewise, but elevates the portion pointing to the scale by swinging the index around a pivot P. If the coil V is a volt-meter coil, or is connected in a derived circuit across the mains, while the coil D is in a line corresponding to D, Fig. 1, the zero would be toward the upper part of the scale, and the index be brought down by the pull of the core K against the retractor Z, and indicate, for example, one hundred and ten volts. If now a current traverse the coil D, and the retracting devices are suitably adjusted, the index or pointer would be carried slightly back toward the zero in accordance with the current flowing in D and it will be readily seen that this modified device might be used to accomplish the same purpose as the apparatus of Figs. 1 and 2.

In Fig. 6, the volt-meter coil V, acting against the retractor Z, draws down the indicator I from the upper part of the scale to indicate one hundred and ten volts, when no current traverses the coil D; the scale itself may be made, as S', elastic, so that when D exerts a pull the scale stretches. It will be manifest that any movement of the index, I, carrying the 110 volt mark downward and leaving the indicator showing a less potential, would accomplish the same result as does the apparatus of Figs. 1 and 2. The distance between the divisions of the scale may therefore be proportionally increased by the movement of the scale instead of the scale being bodily moved, while the divisions remain the same, as shown in the prior figures.

Referring again to Fig. 5, it is manifest that the actions of the coils V, D, might be reversed, in that V might have the coarse winding and become the direct current coil, and D be used as the volt-meter coil, if the retractors Z and Z" be proportioned to give them the requisite range; in which case the zero would be toward the lower part of the scale and the pull of the coil D in response to voltage would raise the indicator working around the fulcrum P, while any current in V would tend to bring such indicator toward the zero.

Still another modification of my invention is shown in Fig. 7. Here the volt-meter coil is indicated at V and pulls upon a core to move an indicator I, toward the left, on being connected across the mains. It, however, is carried together with the index I, on a movable disk T, pivoted at its center and bearing on its front side a curved core K" entering a stationary direct-current coil D; a suitable retractor Z" being provided to pull the core out of the stationary coil D on the cessation or weakening of the current. In this case current in D, when increasing, gradually pulls in the core K' and rotates the disk T, and, in consequence carries the index I toward zero; according to the power of the retractor and the power of the coil D the range of motion given with a certain current is adjusted to be that amount which indicates the drop on the line due to the presence of the load or current, while, as before, an adjustment of the instrument to indicate one hundred and ten volts under load would mean not the presence of one hundred and ten volts at the terminals of the coil V, but at the delivery end of the line. One hundred and ten volts have been simply taken in illustration, and it will of course be understood that the normal potential required at the distant points may be higher or lower than this and the adjustment of the instrument made correspondingly.

I am aware that it has hitherto been proposed to wind an indicating instrument with two coils one of which shall be a pressure coil or volt-meter coil moving an index, and the other of which shall be a direct coil acting differentially with the pressure or volt-meter coil to reduce its action on the magnetic part of the apparatus, and I do not herein claim such a device, the present invention relating to independent means for compensation, whereby the volt-meter coil is unrestricted in its action in moving its indicators, and whereby the action of the direct current is also unrestricted in setting the scale or index.

The advantages accruing in the use of my invention are as follows: That it permits a variation of the retracting devices to be made independently; it permits a change of the winding of either the pressure or direct current coils to be made; furthermore, my direct current adjusting devices may be electro magnetic in character and may be used in combination with a pressure device which is electro-static in character, or in combination with a device which depends upon thermal actions for its indications. In fact, wherever I have described an electro-magnet in the direct circuit it may be by a proper construction replaced by other devices, such as thermic devices whose action is in response to an increase or decrease of current, and wherever I have described a volt-meter device it can be any device which indicates the pressure or voltage by electro-magnetic action, by electro-static action, or by thermic or other action, and the two may be combined in my invention whether they are dependent on the same or different principles of work. Thus I am enabled to make an instrument dependent for its pressure indications on thermic action, and which therefore is capable of being used on alternating currents as well as direct current, and as an instrument which is entirely independent of any relations of difference of lag or phase in such currents, which would not be the case in an instrument depending upon differential electro-magnetic action.

As another example of my invention used with alternating currents of high voltage, an electro-static volt indicator can be combined with a thermic adjustment dependent on the value of the main current and its heating effect, avoiding the difficulty introduced by insulation, and avoiding induction from electro-magnetic parts, which may increase the self-induction.

Having thus described my invention, what I claim, and wish to protect by Letters Patent of the United States, is—

1. An electric measuring instrument, provided with an indicator, devices adapted to move such indicator in accordance with variations of potential, a scale over which the indicator moves, and means responsive to the current in the load circuit and arranged to vary the relative movement of the indicator and the scale in proportion to the drop on the load circuit, substantially as described.

2. An electric measuring instrument, comprising a volt-meter mechanism having a movable scale, and means actuated by the direct current adapted to move the scale.

3. In an electric measuring instrument, an indicator, a coil responsive to variations of potential actuating the indicator, a scale over which the indicator moves, and a coil in the direct or load circuit adapted to move the scale in accordance with the drop on the load circuit, substantially as described.

4. In an electric measuring instrument, an indicator, a coil responsive to variations of potential and actuating the indicator, a suspended scale over which the indicator moves, and a coil in the direct or load circuit adapted to move the scale in accordance with the drop on the load circuit, substantially as described.

5. In an electric measuring instrument, an indicator vibrating about a center, a coil responsive to variations of potential and actuating the indicator, a scale over which the indicator moves suspended concentrically therewith, and a coil in the direct or load circuit adapted to move the scale in accordance with the drop on the load circuit, substantially as described.

6. In an electric measuring instrument, an indicator, as I, actuated by a coil, as V, adapted to respond to variations of potential, so as to move over a movable scale, as S; in combination with a coil, as D, in the load circuit and adapted to move the scale S against the retractor-spring Z in accordance with the drop on the load-circuit, substantially as described and set forth herein.

In witness whereof I have hereunto set my hand this 29th day of June, 1893.

ELIHU THOMSON.

Witnesses:
JOHN W. GIBBONEY,
BENJAMIN B. HULL.